United States Patent [19]

Backman et al.

[11] Patent Number: 5,987,380
[45] Date of Patent: Nov. 16, 1999

[54] HAND-HELD GPS-MAPPING DEVICE

[75] Inventors: Douglas J. Backman, Southborough, Mass.; Gene V. Roe, Henniker, N.H.; Frank D. Defalco, Worcester; William R. Michalson, Charlton, both of Mass.

[73] Assignee: American Navigations Systems, Inc., Millbury, Mass.

[21] Appl. No.: 09/237,152

[22] Filed: Jan. 25, 1999

Related U.S. Application Data

[63] Continuation of application No. 08/835,037, Mar. 27, 1997
[60] Provisional application No. 60/031,655, Nov. 19, 1996.

[51] Int. Cl.$^6$ ........................................... G06K 9/34
[52] U.S. Cl. ..................... 701/208; 382/113; 382/232; 345/202; 707/2
[58] Field of Search .................................. 701/200, 207, 701/208, 212, 213; 382/113, 173, 180, 232, 256, 276, 305; 345/118, 121, 507, 202; 707/1, 2, 104, 530; 340/995, 990

[56] References Cited

U.S. PATENT DOCUMENTS

| 4,550,317 | 10/1985 | Moriyama et al. | 340/995 |
|---|---|---|---|
| 4,598,372 | 7/1986 | McRoberts | 345/202 |
| 4,815,012 | 3/1989 | Feintuch | 340/995 |
| 4,888,698 | 12/1989 | Driessen et al. | 701/200 |
| 5,129,011 | 7/1992 | Nishikawa et al. | 382/173 |
| 5,315,298 | 5/1994 | Morita | 340/995 |
| 5,381,338 | 1/1995 | Wysocki et al. | 701/207 |
| 5,422,814 | 6/1995 | Sprague et al. | 701/213 |
| 5,699,244 | 12/1997 | Clark, Jr. et al. | 702/2 |

OTHER PUBLICATIONS

Advertisement for "Eagle Map Guide Pro GPS", SKY Magazine, (No Date).
"Microslate" product brochure, Jun. 1997.

*Primary Examiner*—William A. Cuchlinski, Jr.
*Assistant Examiner*—Edward Pipala
*Attorney, Agent, or Firm*—Foley, Hoag & Eliot

[57] ABSTRACT

A hand-held navigation, mapping and positioning device contains a GPS receiver, a database capable of storing vector or bit mapped graphics, a viewing port, an embedded processor, a simplified user interface, a data compression algorithm, and other supporting electronics, The viewport is configured such that the data presented in the viewport if clearly visible in any ambient light condition. The database stores compressed image data which might include topographical map data, user annotations, building plans, or any other image. The system includes an interface to a personal computer which may be used to annotate or edit graphic information externally to the device for later upload. In addition, the device contains a simple menu-driven user interface which allows panning and zooming the image data, marking locations of interest, and other such functions. The device may be operated from an internal rechargeable battery, or powered externally.

1 Claim, 8 Drawing Sheets

HAND-HELD GPS-MAPPING DEVICE

This Appln. is a con't of Ser. No. 08/835,037 Filed Mar. 27, 1997. This Appln. also claims the benefit of U.S. Provisional No. 60/031,655 filed Nov. 19, 1996.

FIELD OF THE INVENTION

This invention relates generally to navigation and tracking and specifically to providing real-time positioning on a map image.

BACKGROUND OF THE INVENTION

Most personal navigation systems exist as hand-held devices which report position in terms of latitude, longitude, and altitude. Primitive mapping functions are usually provided that display the path that a user has followed or provide a simple steering indication to facilitate taking a straight line path towards a desired coordinate. More sophisticated systems may include low resolution map information upon which the users coordinates are overlaid.

There are several problems with these existing systems. First, the use of LCD-type displays makes these devices virtually unusable in direct sunlight because of insufficient display contrast. Second, because the storage of detailed images requires large amounts of data storage, map resolution is limited. Third, because of these storage limitations and because of the difficulty of obtaining accurate map data, the selection of maps for users to exploit is very small.

Addressing these issues requires a device which makes improvements in two fundamental areas. First, a new display system is needed which will allow the user to see presented images clearly in all lighting conditions. Second, improvements in data storage must be made to allow the user to store a meaningful amount of high accuracy data.

BRIEF DESCRIPTION OF THE DRAWINGS

The elements of the device described in the following paragraphs which constitute the invention are established in the appended claims. However, understanding the nature of the invention is aided by fully disclosing the characteristics of the device. The following diagrams and illustrations are provided to aid in this understanding:

DETAILED DESCRIPTION OF THE INVENTION

Figure 1:
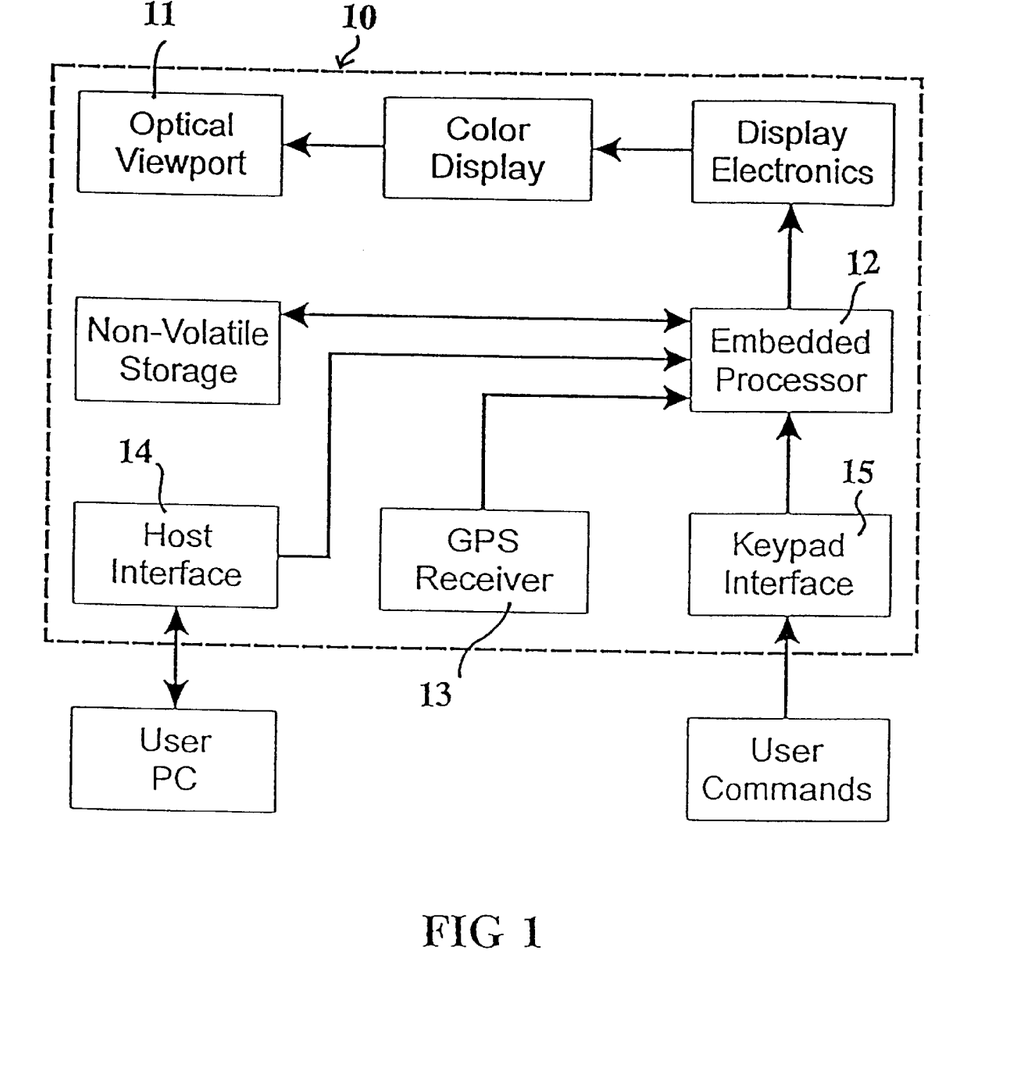
FIG. 1 is a block diagram representation of the entire system.

A block diagram of the system is provided in FIG. 1. As illustrated in the figure, the system 10 contains an optical viewport 11 which takes a small (nominally 18 mm diagonal) LCD or equivalent display and expands the image such that it appears to the user as a full-size computer display. The image is controlled by an embedded processor 12 which retrieves georeferenced map data from a non-volatile storage system. The processor uses position information received from the GPS receiver 13 and creates an image showing the user's position on the color display. The host interface 14 is used to load map data into the handheld unit and the user interface 15 contains pushbuttons for the user to pan and zoom and which allow setting up and configuring the unit.

The purpose of this device is to allow a user to store maps and other information in a small, portable device that also provides position information using a GPS receiver. When using this device, a user would typically obtain raster-format digitized maps which would be edited using companion software on a personal computer. Edits might include the addition of points of interest, waypoints, trails, or other pertinent data. This information would then be uploaded to the device, which would store it in non-volatile memory. Non-volatile storage may also reside on removable memory cards which the user inserts into the handheld unit.

In operation, the device then becomes self-contained, housing a GPS receiver, internal rechargable batteries, map data, and a user display. Using a menu driven interface, the user can see where they are on the map and perform other functions such as calculating the distance to a particular point, or panning and zooming the image to investigate map details. To support users without access to a person computer, the design shall also allow the user to purchase memory cards that are pre-programmed with map data covering specific geographical regions to which the user can add waypoints, trails, and other information using the device's user interface.

In this device there are two areas which required the development of new technology: the optical viewport and the georeferenced data storage/access.

Figure 2A:
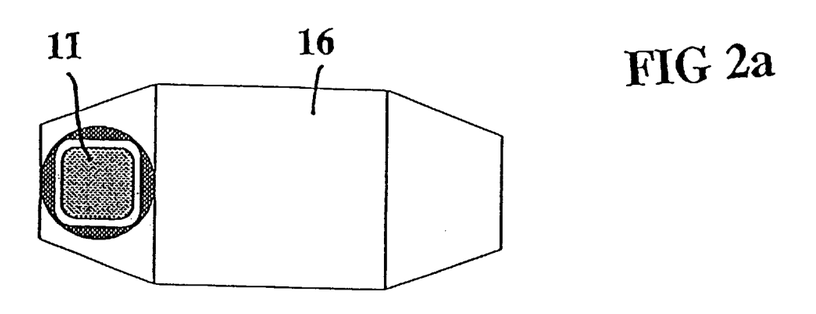
FIG. 2 illustrated the mechanical concept, showing a likeness of the anticipated packaging of the hand-held portion of the system.
Figures 2B, 2C:
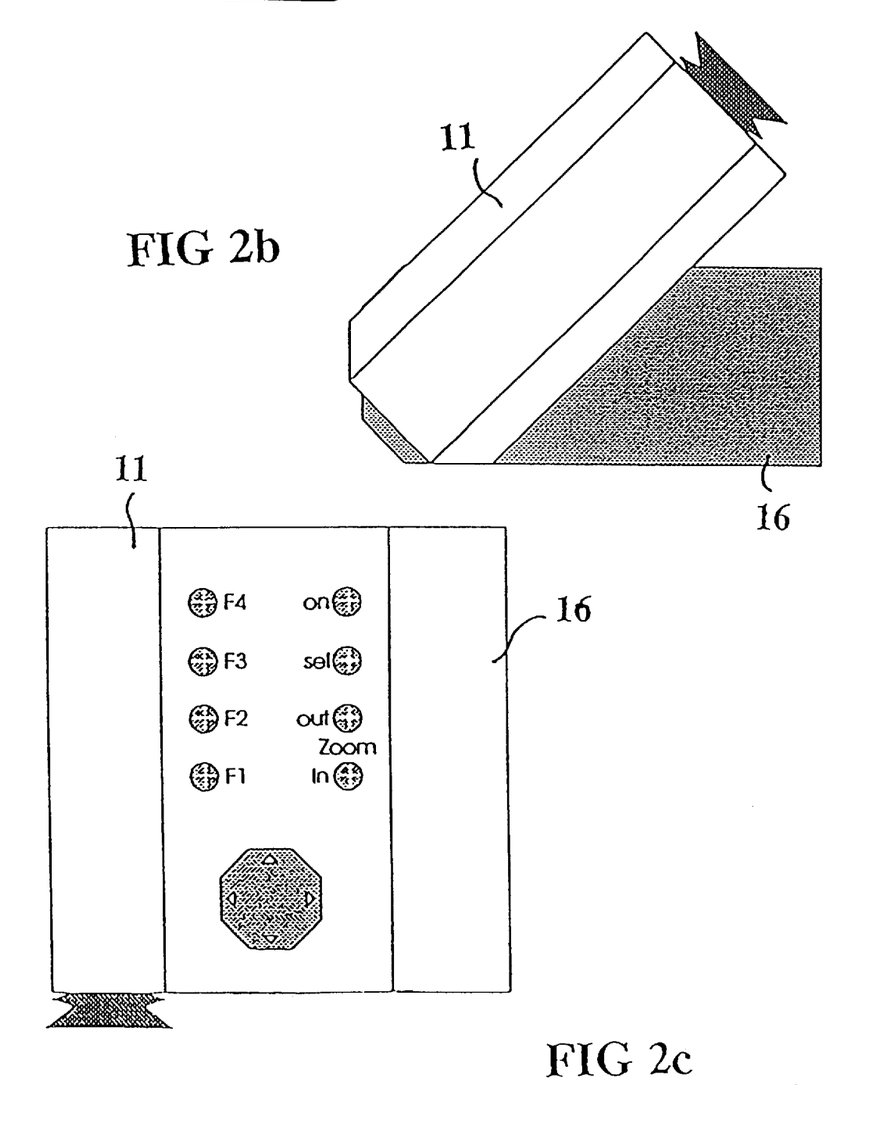

FIG. 2 illustrates the anticipated mechanical configuration of the device. The device will be housed in a high-impact plastic case 16 that is sufficiently conductive internally to shield the internal electronics. On the left side (as viewed from the top) is an optical viewing port 11 that allows the user to see an internal display. In general, the viewport housing may be movable to allow the user additional flexibility when operating the device.

Along the top of the device are user interface buttons. A hexagonal pad dominates the user interface and provides the user the ability to scroll the display right, left, up, down, or along a diagonal. Additional buttons are provided to allow the user to zoom in or out, turn the unit on or off, and to provide additional functions. The front of the unit will hold jacks for communications with an external PC, memory cards, and power for using an external battery and recharging the internal batteries. The antenna for the GPS receiver will be contained internally.

The housings shall be designed in a manner that minimizes penetration by water, salt, sand, and other environmental hazards.

Figure 3:
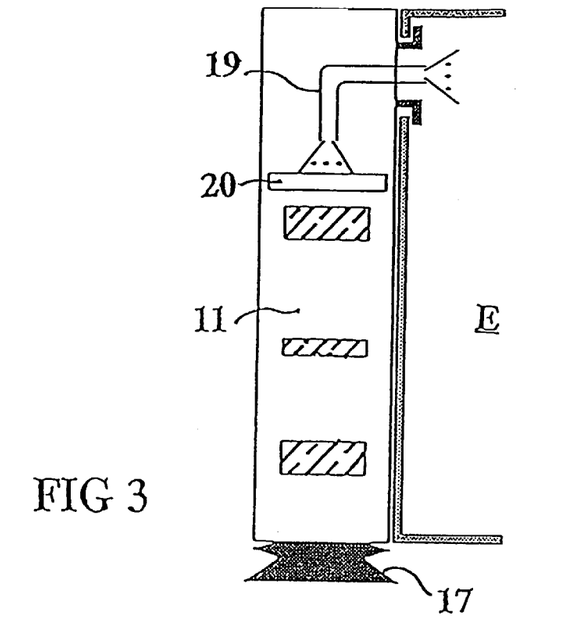
FIG. 3 illustrates the mechanical concept of the optical viewport which shows how the optics are oriented relative to the display and electronic cabling.

A mechanical overview of the optical viewport is illustrated in FIG. 3. At the front end of the device, a rubber bellows similar in nature to a camera light shield reduces the amount of external light which enters the viewport. A system of plastic, polycarbonate, or glass lenses gives the user the illusion that they are viewing a much larger screen than physically exists in the device. The goal is to have the image appear to be approximately 22×30 centimeters as viewed from a distance of about 40–60 centimeters. The display interfaces to the electronics using a flexible cable which passes from the viewport housing into the electronics area of the main housing.

To prevent the entry of contaminants, the viewport housing halves may include a compression gasket. Similarly, the mechanical supports for the optical components may be designed to provide a gas proof seal. Nothing in the design shall prohibit using techniques such as filling the optical area with an inert gas to inhibit the formation of condensation if the device is subjected to temperature and humidity extremes.

Figure 4:
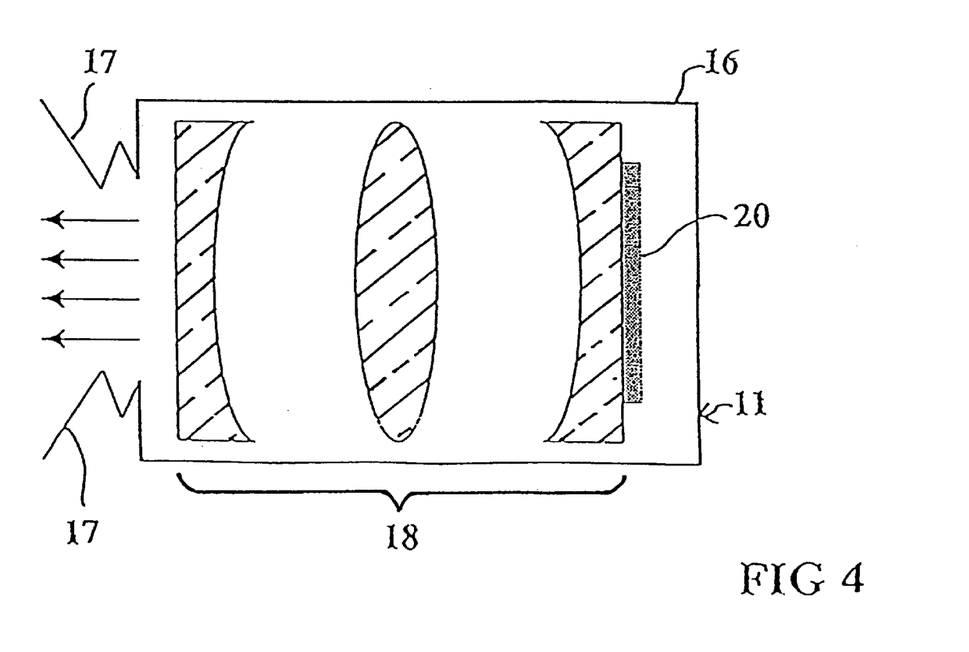
FIG. 4 illustrates the arrangement of lenses relative to the display and details aspects important to shielding the display from ambient light.

The details of the actual imaging system are provided in FIG. 4. Novel characteristics of the viewport include a lack of movable components and sufficient shielding of ambient light that the display becomes usable in direct sunlight. Conversely, provision for backlighting the display allows use of the device in low ambient light conditions. If a focus control proves necessary, it would be integrated between the eyepiece bellows and the first lens of the imaging system.

Data storage and retrieval is a major problem when handling geographic data. A typical USGS quad sheet may require as much as 40–60 Mbytes of storage in uncompressed format. With compression, the data storage requirement drops to approximately 10–15 Mbytes.

In most graphical applications, a 10–15 Mbyte compressed image is decompressed into virtual memory to its original size at which point it can be accessed as if it was a single large array. Since the total memory available in the handheld device will generally be far less than the uncompressed image requires, a more novel data compression, retrieval, and storage scheme is required.

It is essential that the device be able to decompress .tif (or equivalent) images and do pan/zoom in real-time without having to load the entire (decompressed) image in memory.

The problem with TIFF, GEOTIFF, and other standard image storage formats is twofold. First, these file formats generally allow storing information randomly in memory. Second, the data in the files is compressed into variable length records using a technique such as Bit Packing, LZW or Huffman coding. This results in a file that is encoded in a manner that makes it difficult to directly access an arbitrary portion of the compressed image (as would be common when doing pan and zoom).

Figure 5:
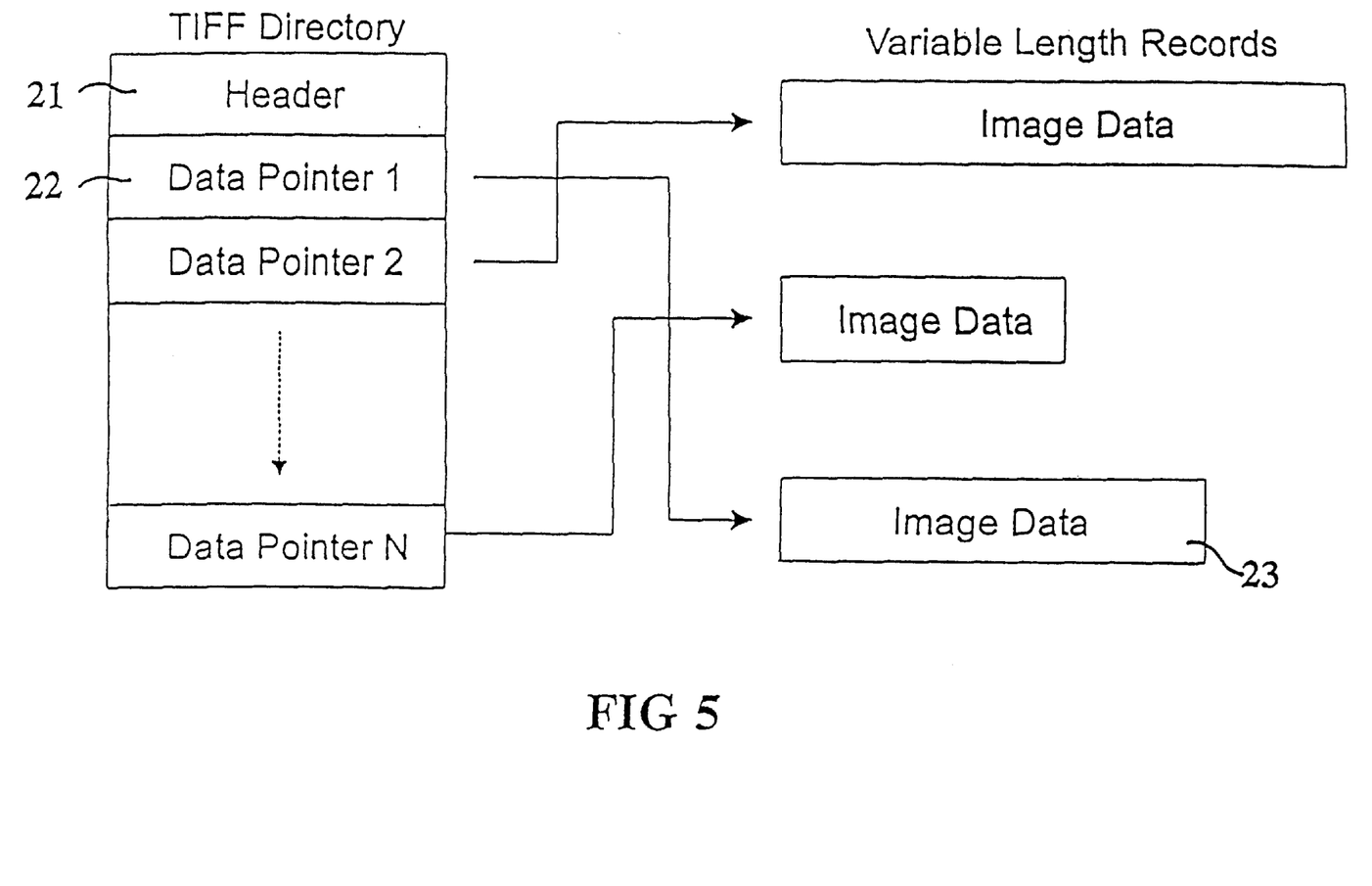
FIG. 5 illustrates the basic concept behind the organization of a TIFF format data file.

As an example, FIG. 5 illustrates the manner in which a TIFF file stores image data. Each TIFF file begins with a predefined header which describes certain essential characteristics of the file such as the byte order, the number of images in the file, and so on. At the end of the header there is a pointer to the first of possibly many directory entries, each of which contains information describing where the data for the component images is stored in the file. These directories contain pointers to the file locations where lines of image data are stored. Since each line of image data is compressed, each record may be of different length.

Figure 6:
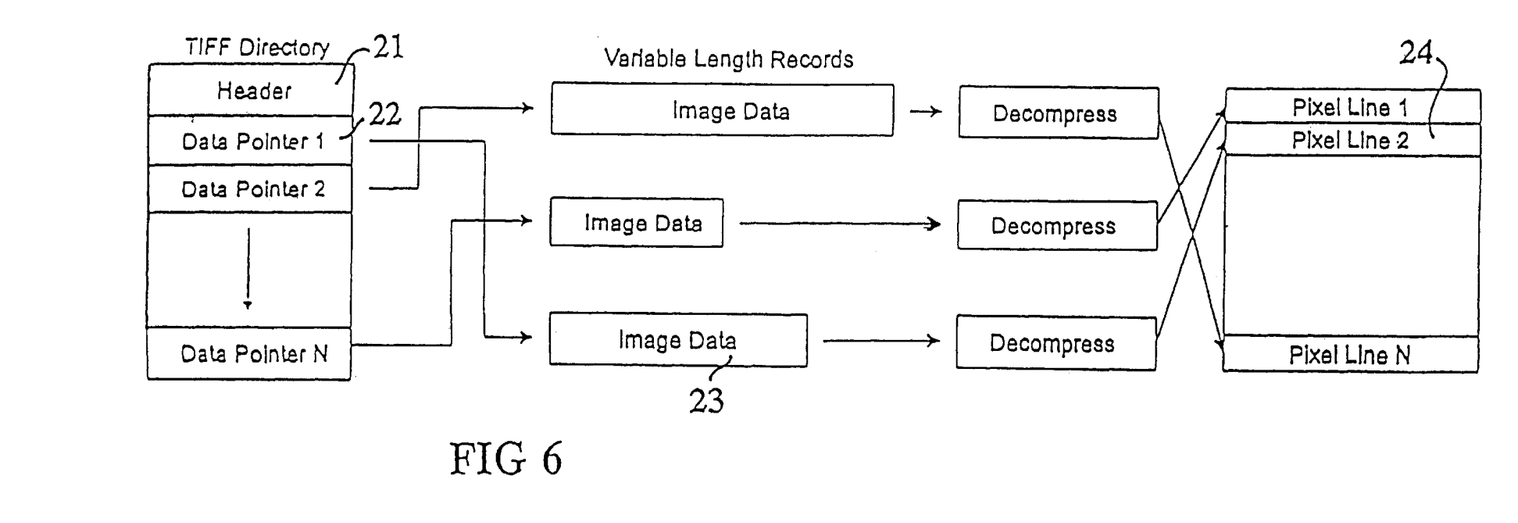
FIG. 6 is a flow diagram of the encoding/decoding process for georeferenced data storage.

The decompression process works in a manner similar to that shown in FIG. 6. The decompression algorithm uses the TIFF header information to determine how many data pointers exist in the file, how long each image data line should be, and the start address of the data pointers. Next, each line is decompressed in sequence to construct the uncompressed image. Only when the image is fully decompressed is the spatial relationship between pixels fully known since the compression algorithm terminates only when it has decompressed a full line of pixels.

Figure 7:
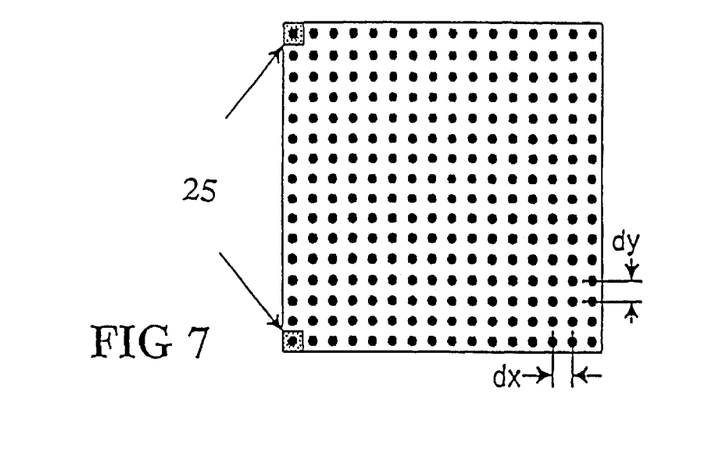
FIG. 7 describes the approach used to attach geographic significance to the stored data file.

As illustrated in FIG. 7, once the image is fully decompressed, precise spatial relationships can be determined. This is accomplished by georeferencing the image data by correlating pixel locations with land features. By knowing the geographic location of one or more reference pixels, the orientation of the pixel image, and distance represented by adjacent pixels (dx and dy) good correspondence between the image and the mapped features is obtained.

Figure 8:
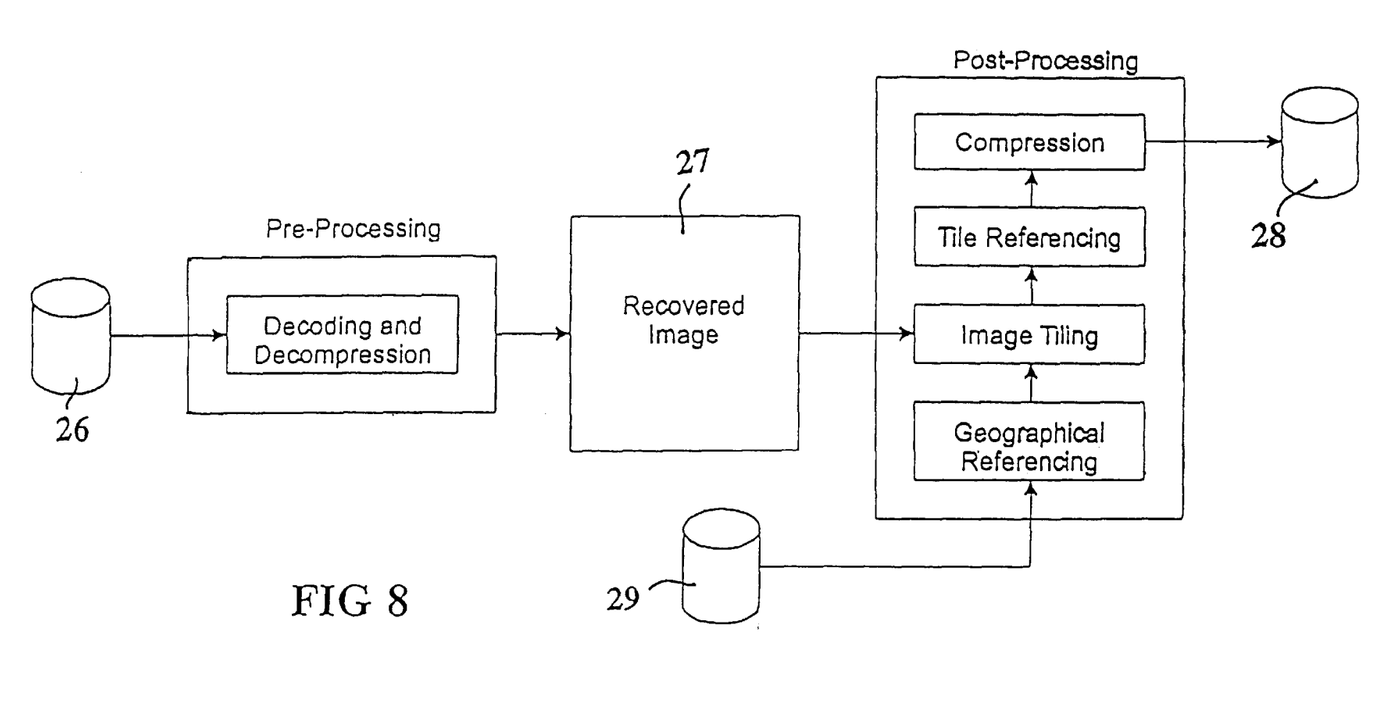
FIG. 8 is a flow diagram of a tile-based compression process embodying the principles of the present invention.

The proposed solution to this problem is outlined in FIG. 8. As shown in the figure, there are two main steps required to process the original TIFF (or other) format image data. The first step involves recovering the original scanned image by decoding it from its original storage format into a complete, uncompressed pixel image. The second step involves post-processing the image by dividing it into more useful square arrays, or tiles, of georeferenced pixel data. An output file is created which contains header information describing size and geographical location of each tile, pointers to the tile data, and compressed tile data.

As shown in FIG. 8, the major steps required to post process the data begin with georeferencing the original image followed by tiling. This georeferencing is done by appending geographical coordinates (latitude, longitude, and altitude) to one or more pixels in the uncompressed image and by providing a suitable mathematical expression to relate pixel spacing to geographical spacing. This mathematical expression may be as simple as a scaling factor such as 1 pixel=50 feet, or it may be a more complicated expression which accounts for spherical corrections.

A typical 1:25,000 scale topographic map spans an area of approximately 15×20 kilometers. Since a land user is typically concerned with only a small portion of this data at any given time, the full image is divided into tiles, each of which contains the data for a significantly smaller region (for example 1 square kilometer). The size of the tiles is governed by a tradeoff between the number of tiles which must be stored uncompressed in memory and the speed of decompression. In general, it is expected that a land user will require at least 4 active tiles in memory to allow seamless panning in the event that the user is located at the intersection of four tiles.

Figure 9:
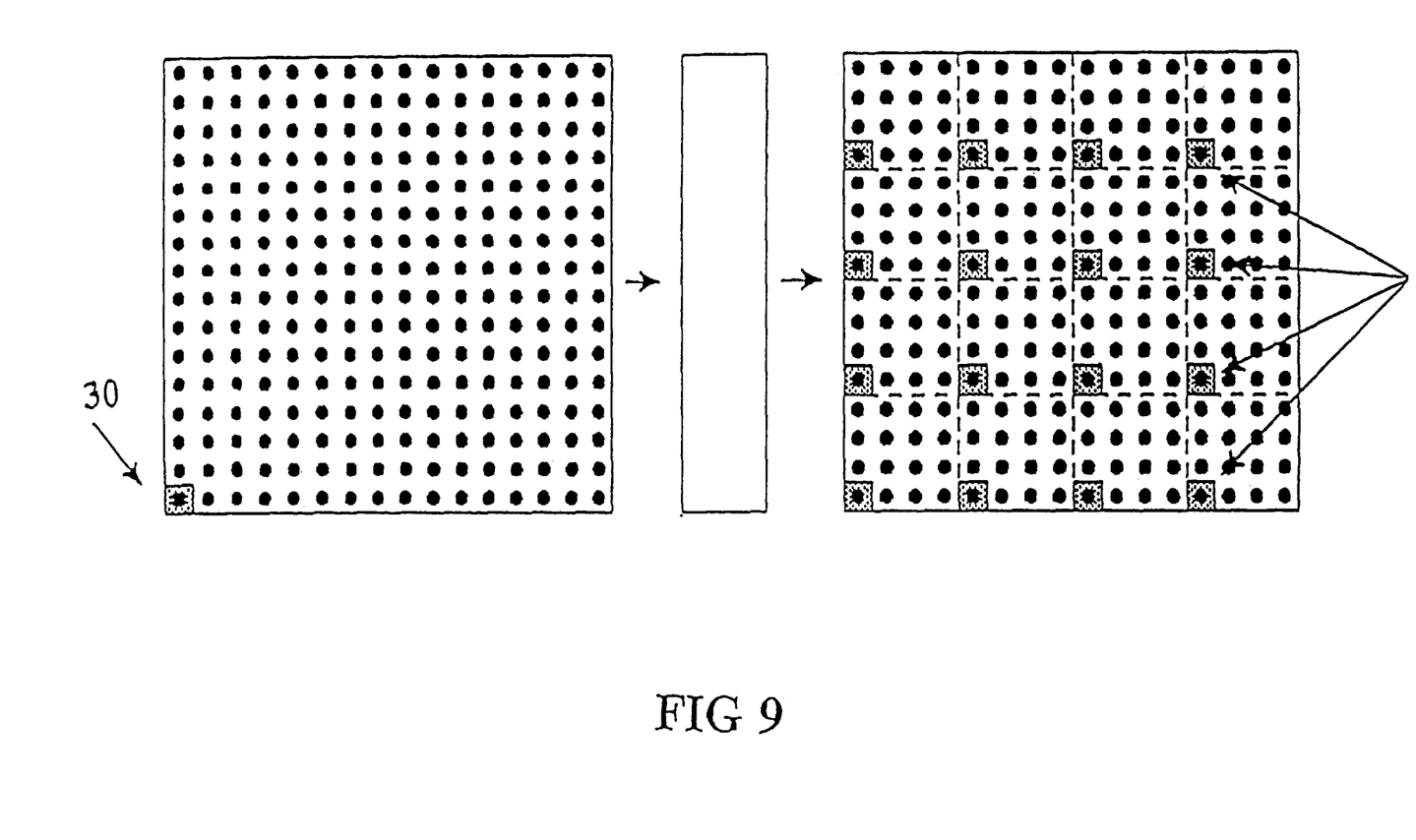
FIG. 9 portrays an approach to providing geographical referencing for each image tile within an image.

Providing geographical referencing for each tile is accomplished, as illustrated in FIG. 9, by computing the geographic location of each tile. Knowing this information, along with the orientation of the tile relative to the full-image geographical reference point and the size of the tile, allows directly determining which tile contains any possible location on the map.

Figure 10:
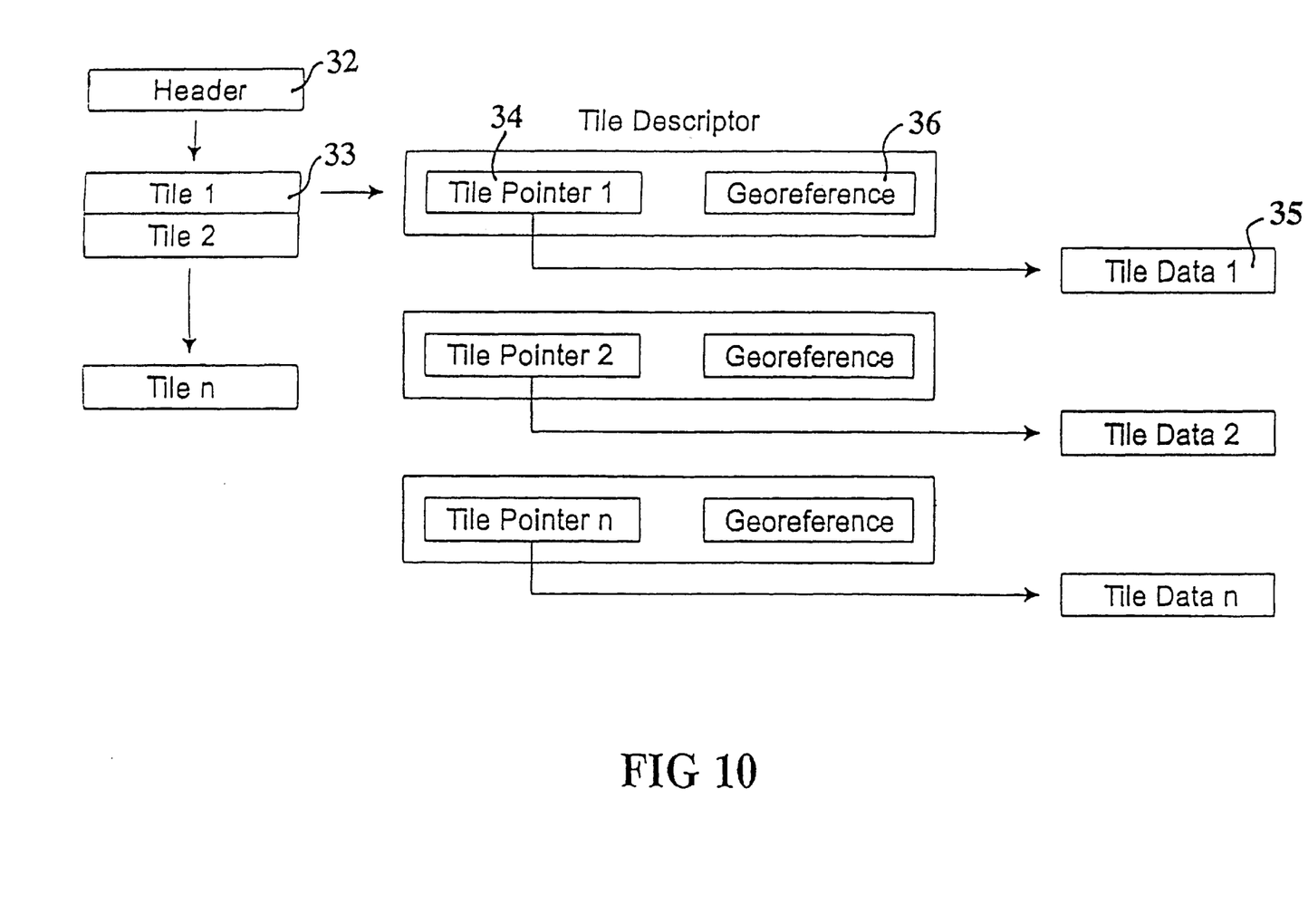
FIG. 10 illustrates the concept of a tile-based image data file embodying the principles of the present invention.

To facilitate efficient use of the tiled data, a file structure such as the one illustrated in FIG. 10 is proposed. A header field contains information about the file structure such as the number of tiles, tile size, number of pixels, aspect ratio, and the required geographic interpolation parameters to calculate position. Following the header, is a variable length field consisting of fixed length records which include a pointer to the start of the image data in each tile and the geographical reference for the tile. The remaining fields are variable length fields which contain compressed image data for each tile.

Given this format, both the location of the tile data in the file and the geographic location of the file reference are both known. Because this is true, variable length data fields no longer pose a problem, since each tile covers a minimum acceptable geographic region. Thus, given a user location, the tiles needed by the user can be directly identified. Since the starting location of the data is known both geographically and in terms of data storage only the desired tile need be decompressed. This format also facilitates caching uncompressed tiles based on user movement to facilitate smooth pan and zoom without requiring that the entire image be decompressed in memory.

What is claimed is:

1. A system for storing an image and viewing a portion of the image, comprising the steps of:
   a) selecting an image,
   b) dividing the image into tiles,
   c) establishing geographical referencing of each tile in its physical relationship within the image,
   d) compressing the image of each tile,
   e) forming an output file of image data of all of the tiles, which, taken together, represent said image, said image data including;
      i) header data describing the size and geographical location of each tile,
      ii) pointers to the location, in the storage unit, of the data for each tile,
      iii) compressed tile data for each tile,
   f) storing the image data in the output file in an image storage unit adapted to store image data and to provide the image data to a computer,
   g) selecting a tile to view using the geographical referencing data,
   h) locating the tile image data of the said tile using the pointer, and
   i) decompressing the tile image data of the said tile.

* * * * *